US007158820B2

(12) United States Patent
Suzuki et al.

(10) Patent No.: US 7,158,820 B2
(45) Date of Patent: Jan. 2, 2007

(54) MOBILE COMMUNICATION TERMINAL

(75) Inventors: Hiromichi Suzuki, Ome (JP); Takashi Amano, Soka (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 117 days.

(21) Appl. No.: 10/948,876

(22) Filed: Sep. 24, 2004

(65) Prior Publication Data

US 2005/0153755 A1 Jul. 14, 2005

(30) Foreign Application Priority Data

Jan. 13, 2004 (JP) ............................ 2004-005750

(51) Int. Cl.
*H04M 1/00* (2006.01)

(52) U.S. Cl. ................................ 455/575.7; 455/575.7

(58) Field of Classification Search ............. 455/562.1, 455/575.1, 575.7, 274, 121, 129, 269
See application file for complete search history.

(56) References Cited

U.S. PATENT DOCUMENTS

| | | | | |
|---|---|---|---|---|
| 6,064,343 | A * | 5/2000 | Crowley et al. | 343/702 |
| 6,236,368 | B1 | 5/2001 | Johnson | |
| 6,351,629 | B1 * | 2/2002 | Altschul et al. | 455/90.1 |
| 6,781,551 | B1 * | 8/2004 | Gerber | 343/702 |
| 2003/0071757 | A1 | 4/2003 | Yamaki | |
| 2003/0096637 | A1 * | 5/2003 | Keller et al. | 455/562 |
| 2005/0151690 | A1 * | 7/2005 | Minemura | 343/702 |
| 2005/0151691 | A1 * | 7/2005 | Mizoguchi et al. | 343/726 |
| 2005/0178835 | A1 * | 8/2005 | Akiho et al. | 235/451 |

FOREIGN PATENT DOCUMENTS

| | | | |
|---|---|---|---|
| EP | 0 933 832 | A2 | 8/1999 |
| JP | 52-14334 | | 2/1977 |
| JP | 54-62641 | | 10/1977 |
| JP | 08-321719 | A | 12/1996 |
| JP | 2001-237637 | A | 8/2001 |
| JP | 2001326514 | A * | 11/2001 |
| JP | 2002-043826 | A | 2/2002 |
| JP | 2003-188631 | A | 7/2003 |
| JP | 2003-535541 | A | 11/2003 |
| JP | 2004-201049 | A | 7/2004 |

OTHER PUBLICATIONS

Li, R. L. et al., "Pattern shaping using a reactively loaded wire loop antenna" IEE Proceedings—Microwaves, Antennas & Propagation, Institution of Electrical Engineers, Stevenage, GB, vol. 148, No. 3, Jun. 11, 2001, pp. 203-208, XP006016880, ISSN: 0950-107X.

Nakano H. et al., "A Low-Profile Conical Beam Loop Antenna with an Electromagnetically Coupled Feed System" IEEE Transactions on Antennas and Propagation, IEEE Inc. New York, U.S., vol. 48, No. 12, Dec. 2000, pp. 1864-1866, XP001005155, ISSN: 0018-926X.

* cited by examiner

*Primary Examiner*—CongVan Tran
(74) *Attorney, Agent, or Firm*—Frishauf, Holtz, Goodman & Chick, P.C.

(57) ABSTRACT

A mobile communication terminal of a portable telephone is housed in a casing having a first surface. A receiver section of the portable telephone capable of generating a voice is arranged on the first surface. A two-wavelength loop antenna arranged on a plane substantially parallel to the first plane and formed of a looped line having a right section and a left section that are in symmetry with respect to an imaginary vertical symmetric line is housed in the casing. A power supply point for supplying an electric power to the loop antenna is arranged in the vicinity of the intersection between the symmetric line and the looped line.

1 Claim, 15 Drawing Sheets

MOBILE COMMUNICATION TERMINAL

CROSS-REFERENCE TO RELATED APPLICATIONS

This application is based upon and claims the benefit of priority from prior Japanese Patent Application No. 2004-005750, filed Jan. 13, 2004, the entire contents of which are incorporated herein by reference.

BACKGROUND OF THE INVENTION

1. Field of the Invention

The present invention relates to a mobile communication terminal, particularly, to a mobile communication terminal equipped with a loop antenna housed in the casing of the mobile communication terminal.

2. Description of the Related Art

A loop antenna in which the directivity characteristics of radiated electric wave is controlled is disclosed in, for example, Japanese Patent Disclosure (Kokai) No. 2001-237637. In the loop antenna disclosed in Japanese Patent Disclosure No. 2001-237637 referred to above, a waveguide plate having a surface parallel to the plane of the loop antenna is arranged at a position a prescribed distance apart from the plane of the loop antenna in the vertical direction. The loop antenna exhibits the radiation characteristics of the electric wave having a directivity in a direction perpendicular to the plane of the loop antenna. Particularly, the loop antenna exhibits the greatest radiation characteristics toward the waveguide plate. In this fashion, the loop antenna is combined with the waveguide plate so as to utilize the loop antenna as a primary radiator of a parabolic antenna.

In the case of using a loop antenna in a portable telephone, the line length of the loop antenna that is determined by the wavelength is rendered considerably large. Since the loop antenna is housed in the portable telephone, the line length of the loop antenna is secured by arranging the front surface of the portable telephone on which is positioned the receiver in parallel to the plane of the loop antenna.

Where the loop antenna disclosed in Japanese Patent Disclosure No. 2001-237637 referred to above is mounted to the portable telephone of the construction described above, a radiation energy is generated in a direction perpendicular to the plane of the loop antenna, i.e., the radiation energy is generated toward the user of the portable telephone. As a result, a mismatch loss and a dielectric loss is generated on the basis of the human body forming a dielectric element so as to give rise to the problem that the radiation efficiency of the antenna is lowered.

BRIEF SUMMARY OF THE INVENTION

An object of the present invention is to provide a loop antenna exhibiting a radiation directivity that the radiation toward the user of the portable telephone is avoided.

According to an aspect of the present invention, there is provided a mobile communication terminal, comprising:

a casing having a first surface;

a receiver section arranged on the first surface of the casing, configured to reproduce a voice;

a two-wavelength loop antenna housed in the casing, arranged along a plane substantially parallel to the first surface of the casing, and including a looped line that is divided by an imaginary vertical symmetric line into a right portion and a left portion that are substantially in symmetry with respect to the imaginary vertical symmetric line; and a power supply point arranged in the vicinity of the intersection between the symmetrical line and the looped line for supplying an electric power to the loop antenna.

DETAILED DESCRIPTION OF THE INVENTION

The loop antennas according to some embodiments of the present invention will now be described with reference to the accompanying drawings.

Figure 1:
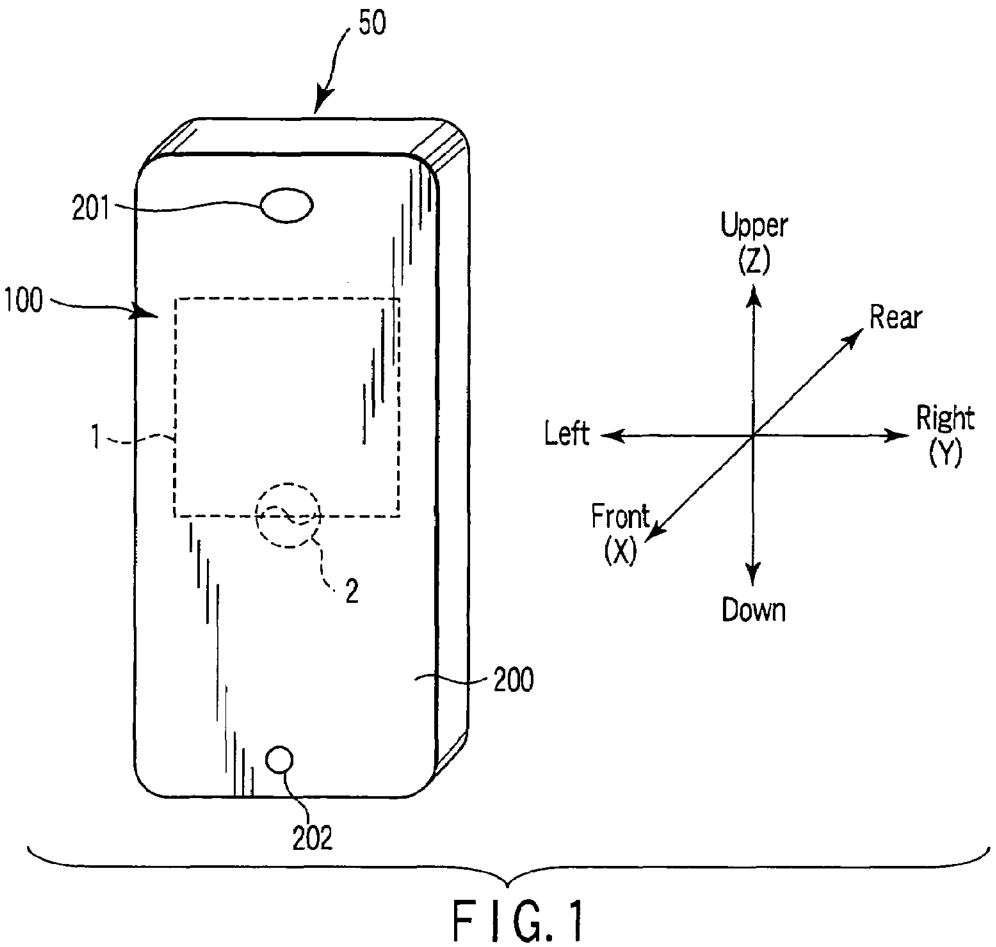
FIG. 1 is an oblique view schematically showing the outer appearance of a portable telephone equipped with a loop antenna of the present invention together with the coordinate axes.

FIG. 1 schematically shows the configuration of a portable telephone, in which the loop antenna according to each of the embodiments of the present invention can be housed, together with the coordinate system. The coordinate system shown in FIG. 1 indicates the front direction, the rear direction, the left direction, the right direction, the upper direction and the down direction in the portable telephone shown in FIG. 1. In this coordinate system, the front direction is defined to be the positive direction in the X-axis, the right direction is defined to be the positive direction in the Y-axis, and the upper direction is defined to be the positive direction in the Z-axis. A receiver 201 including a loud speaker is arranged in the upper portion and a transmitter 202 including a microphone is arranged in the lower portion on the front surface 200 of the portable telephone 50. In performing the telephone conversation by using the portable telephone 50, the ear of the user of the portable telephone 50 is allowed to abut against the receiver 201, and the mouth of the user is positioned close to the transmitter 202. It follows that the front direction corresponds to the direction in which the portable telephone 50 is allowed to face the user of the portable telephone 50.

A loop antenna 100 having a loop shape on a plane substantially parallel to the front surface 200 (YZ plane) is arranged inside the portable telephone 40. The loop antenna 100 includes a looped line 1 and a power supply point 2 positioned in the lower portion of the looped line 1 for supplying an electric current to the looped line 1.

Figure 2:
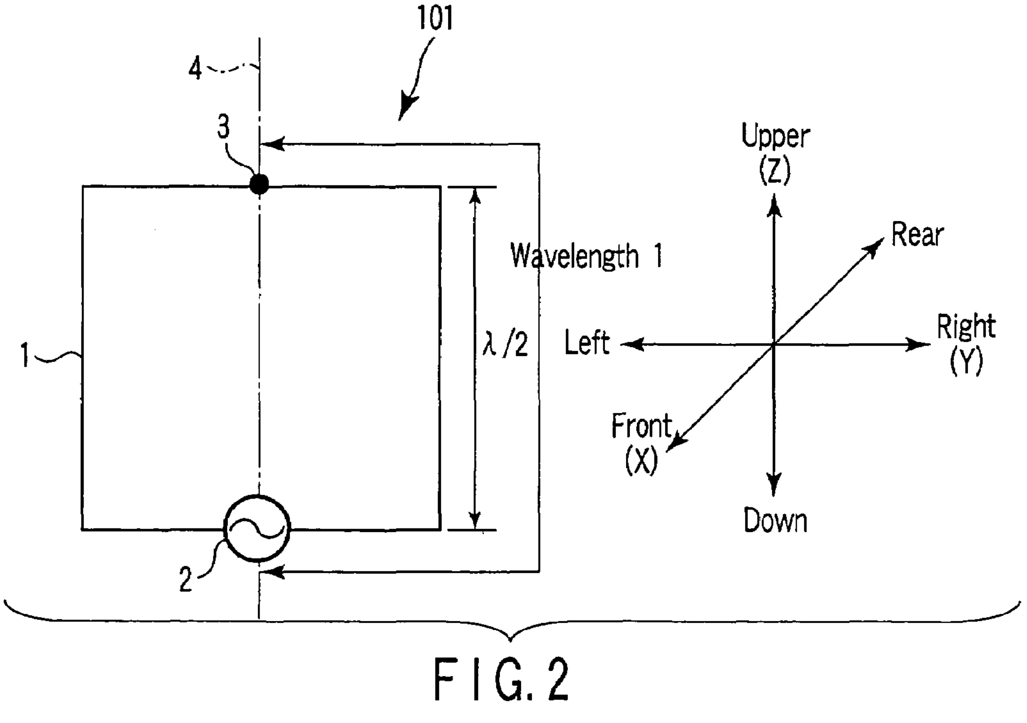
FIG. 2 is a plan view schematically showing the configuration of the loop antenna according to a first embodiment of the present invention, which can be housed in the portable telephone shown in FIG. 1, together with the coordinate axes.
Figure 3:
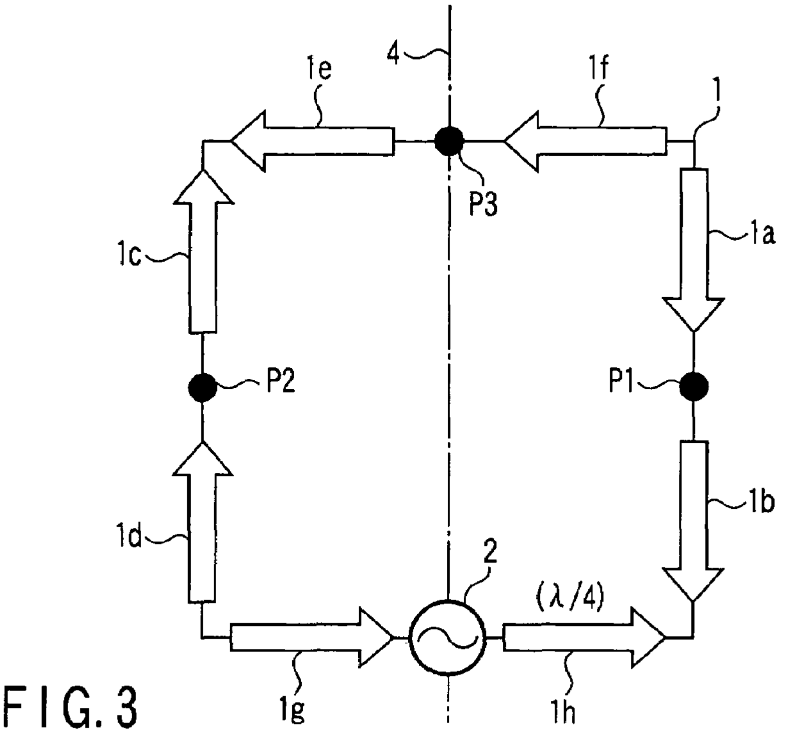
FIG. 3 schematically shows the current distribution for explaining the operating principle of the loop antenna shown in FIG. 1.
Figure 4:
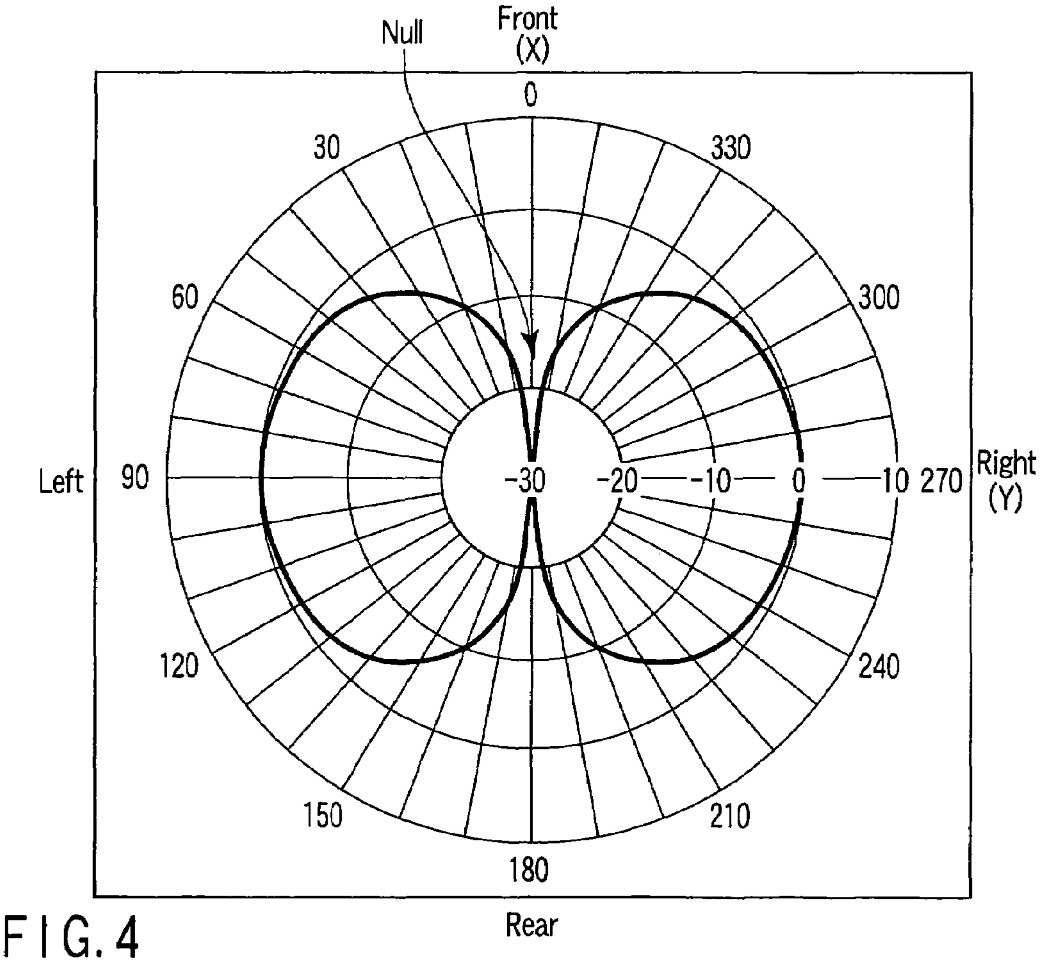
FIG. 4 shows a radiation pattern of an electromagnetic field in the loop antenna shown in FIG. 1.
Figure 5:
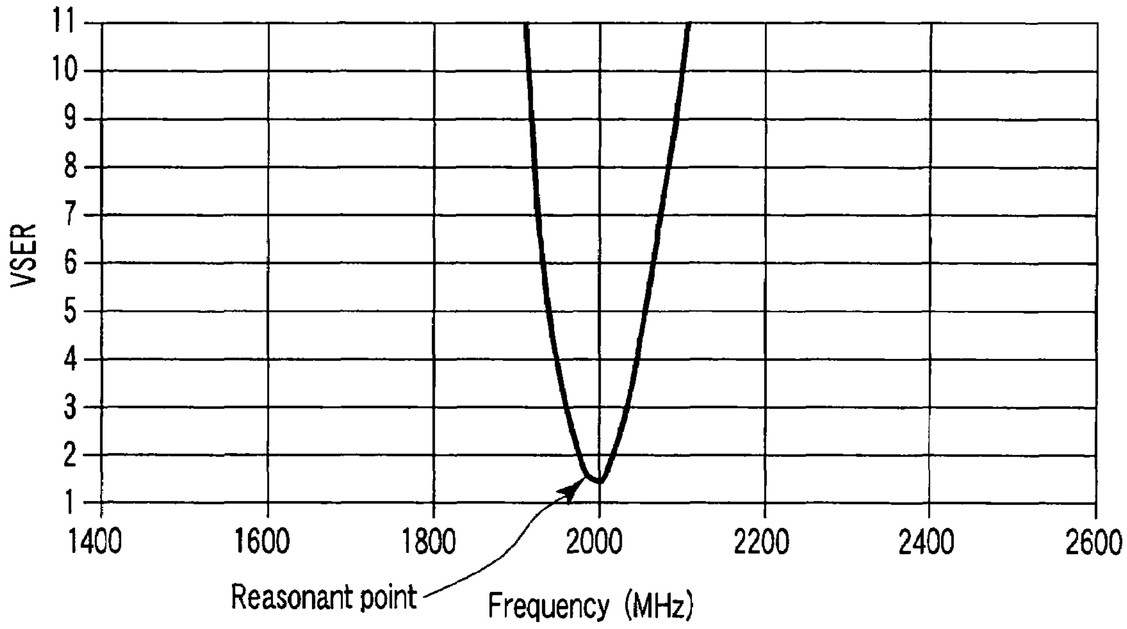
FIG. 5 is a graph showing the relationship between the VSWR value and the frequency of the loop antenna shown in FIG. 1.

FIGS. 2 to 5 collectively show a first embodiment in which the technical idea of the present invention is applied to a portable telephone. Specifically, FIG. 2 schematically shows the configuration of a loop antenna 101. FIG. 3 shows the current distribution for explaining the operating principle of the loop antenna. FIG. 4 shows the radiation pattern of the electromagnetic field within the loop antenna. Further, FIG. 5 is a graph showing the relationship between the value of VSWR (Voltage Standing Wave Ratio) and the frequency based on the power supply point.

The loop antenna 101 shown in FIG. 2 comprises a line 1 forming a rectangular loop and a power supply point 2 for supplying a current to the line 1. In the loop antenna 101 shown in FIG. 2, the right portion and the left portion of the looped line 1 are arranged in symmetry with respect to a symmetric line 4 extending through a half point 3 in respect of the line length of the line 1 and the power supply point 2. In the rectangular loop antenna 101, the line corresponding to the right side or the left side of the loop is defined to have a length equal to a ½ wavelength ($\lambda/2$) of an electric wave having a prescribed frequency. Also, the entire length of the line 1 including the four sides of the rectangular loop is defined to be equal to two wavelengths ($2\lambda$) of the prescribed frequency. Further, the half point 3 corresponds to the position apart from the power supply point 2 along the looped line 1 by one wavelength.

Incidentally, it should be noted that the expressions "half point 3" and "symmetric line 4", which are used in the present specification for explaining the loop antenna, represent the geometric abstract concepts for defining the shape or the positional relationship of the constituting elements such as the loop antenna. Also, the term "parallel" used in the present specification does not imply "strictly parallel" and includes "substantially parallel" as far as the object of being parallel can be achieved so as to solve the problem. This is also the case with the other terms such as "symmetry with respect to a line", "one wavelength", and "the same plane". FIG. 2 also shows the coordinate system denoting the front direction, the rear direction, the left direction, the right direction, the upper direction and the down direction as in FIG. 1 for clearly setting forth the arranging direction of the loop antenna.

FIG. 3 shows the distribution of the current flowing within the loop antenna 101 shown in FIG. 2. If an electric power is supplied from the power supply point 2 to the line 1, a driving current flows into the line 1. The driving current is rendered maximum at the power supply point 2 and at points P1 and P2, which are apart from the power supply point 2 by ½ wavelength along the line 1. The driving current is also rendered maximum at point P3, which is apart from the point P1 or P2 by ½ wavelength along the line 1. Also, a driving current vector is generated in each side of the rectangular line 1. To be more specific, driving current vectors 1*a*, 1*b* in the negative Z direction are generated on the right side portion of the rectangular line 1, and driving current vectors 1*c*, 1*d* in the positive Z direction are generated on the left side portion of the rectangular line 1. Similarly, driving current vectors 1*e*, 1*f* in the negative Y direction are generated in the upper side portion of the rectangular line 1, and driving current vectors 1*g*, 1*h* in the positive Y direction are generated in the lower side portion of the rectangular line 1. It follows that an electromagnetic field is generated around the loop antenna 101, and the electromagnetic field thus generated is radiated to the free space. It should be noted that the driving current vectors have opposite phases with respect to the symmetric line 4.

FIG. 4 shows the result of the simulation of the radiation pattern of the electromagnetic field generated within the XY plane by the driving current vectors shown in FIG. 3. The driving current vectors are generated in opposite phases that are in symmetry with respect to the symmetric line 4 as shown in FIG. 3. It follows that an electromagnetic field is radiated around the loop antenna 101, and the radiated electromagnetic field is combined and generated in the surrounding free space as a combined radiation pattern. As shown in FIG. 4, the central portion in the right-left direction of the radiation pattern is constricted in the front-rear direction so as to form a null. It should be noted that the front direction is the direction toward the user of the portable telephone. The null is generated in the front direction so as to lower the intensity of the electric field.

FIG. 5 shows the frequency characteristics of VSWR at the power supply point 2 shown in FIG. 2. The loop antenna 101 shown in FIG. 2 exhibits the frequency characteristics of a single ridge type, which has a single resonance point that is determined by the length of the line 1, as shown in FIG. 5.

According to the first embodiment of the present invention, a null is generated in the radiation characteristics in a direction perpendicular to the plane of the loop antenna, i.e., in the direction toward the user of the portable telephone. Since the null is generated in the direction toward the human body, which can be regarded as a dielectric element, it is substantially possible to prevent the mismatch loss and the dielectric loss derived from the human body so as to improve the antenna radiation efficiency.

Figure 6:
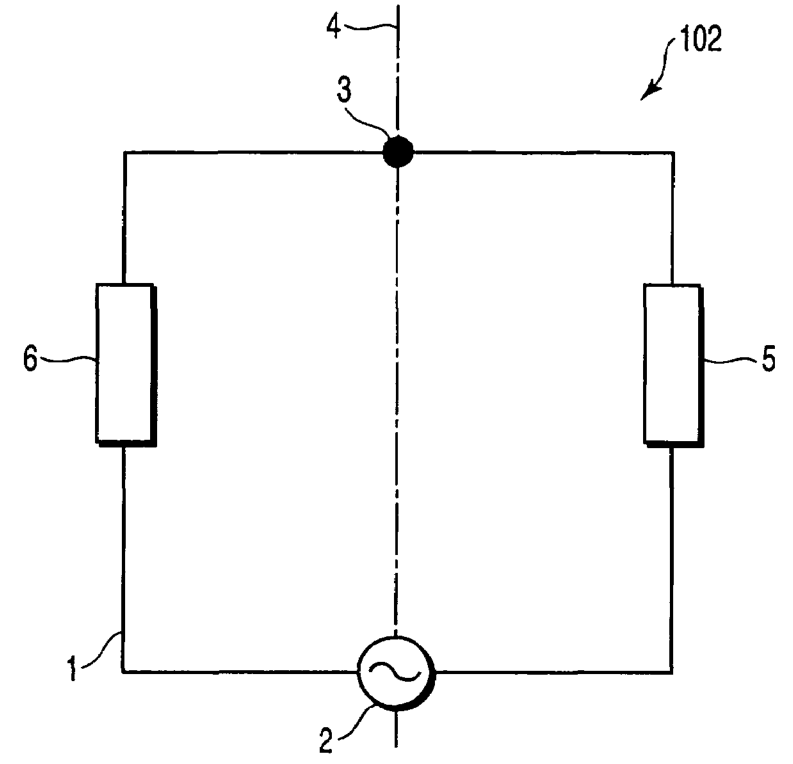
FIG. 6 schematically shows the configuration of a loop antenna, which can be housed in the portable telephone shown in FIG. 1, according to a second embodiment of the present invention.
Figure 7:
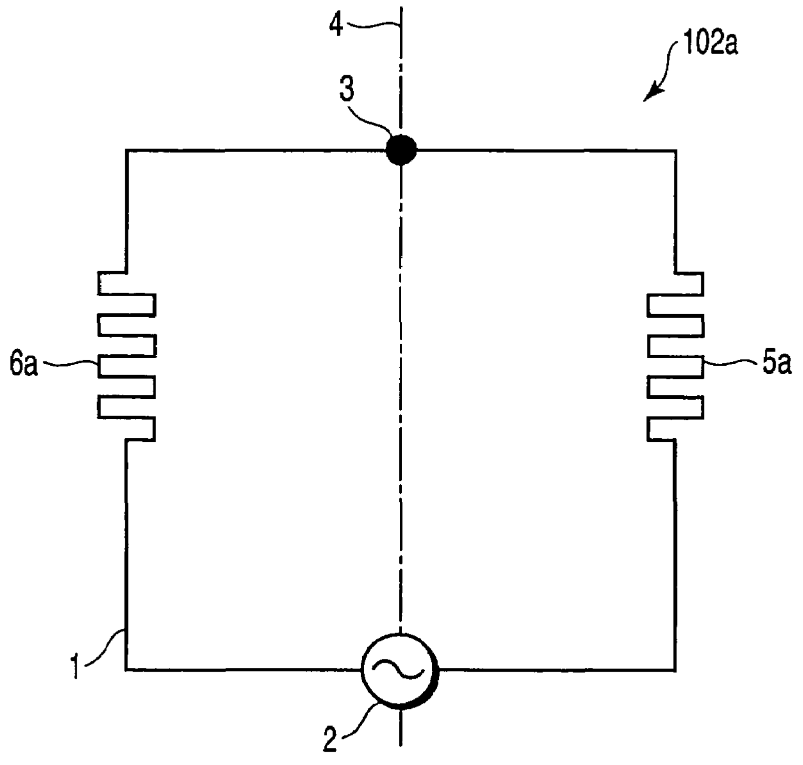
FIG. 7 schematically shows a specific configuration of the loop antenna shown in FIG. 6.
Figure 8:
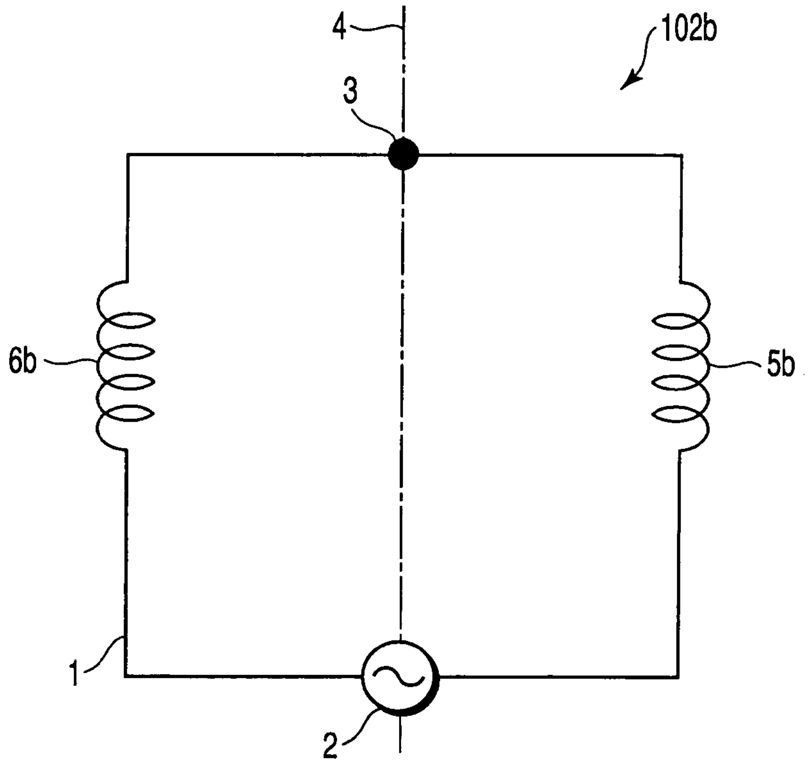
FIG. 8 schematically shows another specific configuration of the loop antenna shown in FIG. 6.
Figure 9:
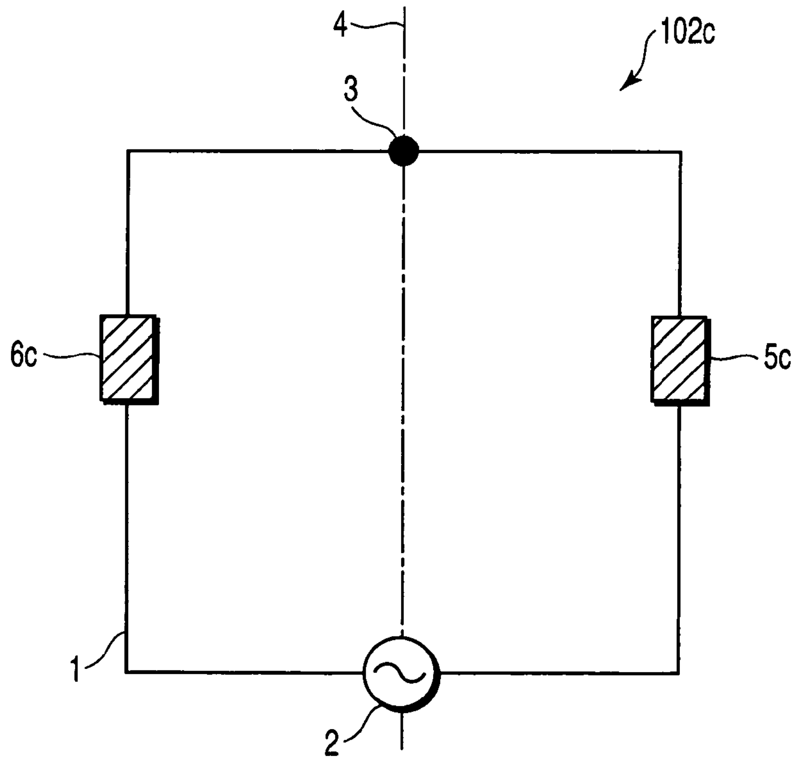
FIG. 9 schematically shows still another specific configuration of the loop antenna shown in FIG. 6.

FIGS. 6 to 9 collectively show a second embodiment in which the technical idea of the present invention is applied to a loop antenna for a portable telephone. Specifically, FIG. 6 schematically shows the configuration of the loop antenna. FIG. 7 shows a loop antenna equipped with a specific component as a miniaturizing unit shown in FIG. 6. FIG. 8 shows a loop antenna equipped with another specific component as a miniaturizing unit. Further, FIG. 9 shows a loop antenna equipped with still another specific component as a miniaturizing unit.

As shown in FIG. 6, a component 5 for miniaturizing a loop antenna 102 is connected to the right side portion of the line 1 of the loop antenna 102. Similarly, a component 6 for miniaturizing the loop antenna 102 is connected to the left side portion of the line 1 of the loop antenna 102. These miniaturizing components 5 and 6 are arranged in symmetry with respect to the symmetric line 4. It should be noted that each of the miniaturizing components 5 and 6 corresponds to the section in which the line is shaped like a meander, i.e., shaped zigzag, or is formed helical, or corresponds to, for example, a dielectric element mounted to the line, and has an electric line length larger than the mechanical size. The electric line length is imparted to the loop antenna 102 so as to set the loop antenna 102 at a prescribed line length. In the loop antenna 102 shown in FIG. 6, a prescribed entire length of the electrical line of the line 1 corresponding to the length along the four sides of the rectangular line 1 is set at the length equal to two wavelengths of a prescribed frequency, and the half point 3 is set at the position apart from the power supply point 2 by one wavelength along the line 1.

It follows that the loop antenna 102 shown in FIG. 6 exhibits the characteristics similar to those of the loop antenna shown in FIG. 2. It is also possible to form the loop antenna 102 with a small equivalent electric line length. As a result, the portable telephone equipped with the loop antenna 102 as shown in FIG. 6 can be made smaller in size.

As shown in FIG. 7, it is possible for the loop antenna **102*a* to comprise meander-like miniaturizing means 5*a* and 6*a* as the miniaturizing components 5 and 6. Also, as shown in FIG. 8, it is possible for the loop antenna 102*b* to comprise helical miniaturizing means 5*b*, 6*b* as the miniaturizing components 5 and 6. Further, as shown in FIG. 9, it is possible for the loop antenna 102*c* to comprise dielectric elements 5*c* and 6*c* as the miniaturizing components 5 and 6**.

According to the second embodiments shown in FIGS. 6 to 9, it is possible to form a null in the radiation characteristics in the direction toward the user of the portable telephone so as to make it possible to improve the antenna radiation efficiency without giving rise to the mismatch loss and the dielectric loss derived from the human body. It is also possible to provide a miniaturized loop antenna and a miniaturized portable telephone.

Figure 10:
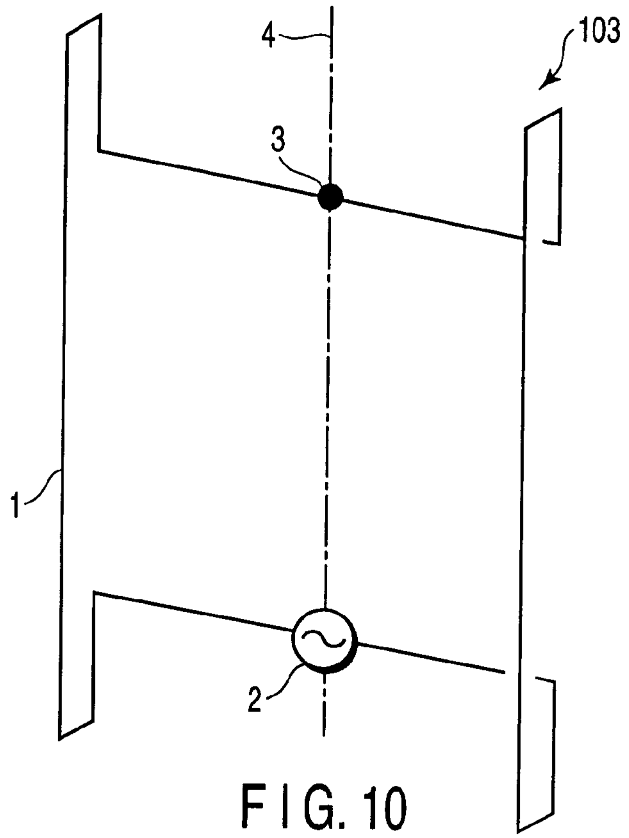
FIG. 10 is an oblique view schematically showing the configuration of a loop antenna, which can be housed in the portable telephone shown in FIG. 1, according to a third embodiment of the present invention.
Figure 11:
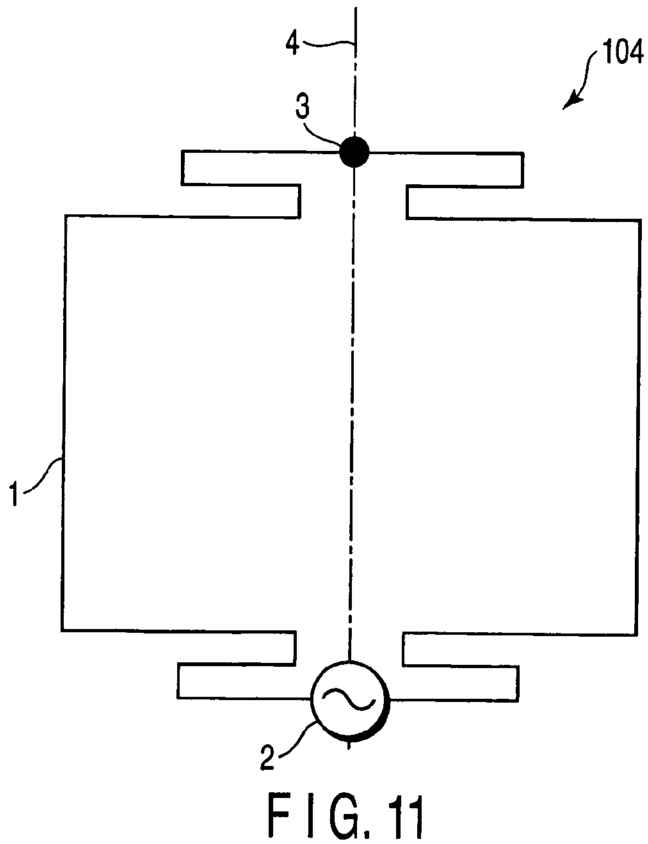
FIG. 11 schematically shows the construction relating to a modification of the loop antenna shown in FIG. 10.

FIGS. 10 and 11 collectively show a loop antenna for a portable telephone according to a third embodiment of the present invention. Specifically, FIG. 10 is an oblique view schematically showing the configuration of the loop antenna 103, and FIG. 11 schematically shows another construction relating to a modification of the loop antenna shown in FIG. 10.

In the loop antenna 103 shown in FIG. 10, the upper and lower portions of the looped line 1 are folded toward the inside of the loop antenna 103, and the right side section and the left side section are erected relative to the plane including the upper portion and the lower portion of the line 1. The entire length of the line 1 starting from the power supply point 2, passing through the half point 3, and ending in the power supply point 2 is set at the length equal to two wavelengths of a prescribed frequency, and the half point 3 is positioned one wavelength apart from the power supply point 2.

FIG. 11 shows a loop antenna, which has another construction relating to a modification of the loop antenna shown in FIG. 10. In the loop antenna 104 shown in FIG. 11, the upper side section of the line 1 is not linear but is folded in a manner to form right and left sections that are shaped in symmetry with respect to the symmetric line 4. It should be noted that the upper portion of the loop antenna 104 is substantially shaped like a letter T as a whole. Likewise, the lower side section of the line 1 is not linear but is folded in a manner to form right and left sections that are shaped in symmetry with respect to the symmetric line 4. It should be noted that the lower portion of the loop antenna 104 is substantially shaped like a letter T that is reversed as a whole. The entire length of the line 1 starting from the power supply point 2, passing through the half point 3, and ending in the power supply point 2 is set at the length equal to two wavelengths of a prescribed frequency, and the half point 3 is positioned one wavelength apart from the power supply point 2. Incidentally, the folding shape is not limited to the shape of a letter T (entire shape) as far as the right and left portions of the folded structure are in symmetry with respect to the symmetric line 4. In other words, it is possible for each of the upper side section and the lower side section of the line 1 to be folded in another shape.

According to the loop antenna shown in each of FIGS. 10 and 11, it is possible to diminish the size of the entire loop antenna by folding a part of the line 1 while securing the line length of the line 1. The loop antenna shown in each of FIGS. 10 and 11 has a line length equal to that of the loop antenna shown in FIG. 2 and is shaped such that right and left sections of the loop antenna are in symmetry with respect to the symmetric line 4. It follows that the characteristics of each of the loop antennas 103 and 104 shown in FIGS. 10 and 11 are equal to those of the loop antenna shown in FIG. 2. Also, since the small loop antenna 104 can be formed with the line length equal to that of the loop antenna shown in FIG. 2, the portable telephone housing the loop antenna can be made smaller in size.

Figure 12:
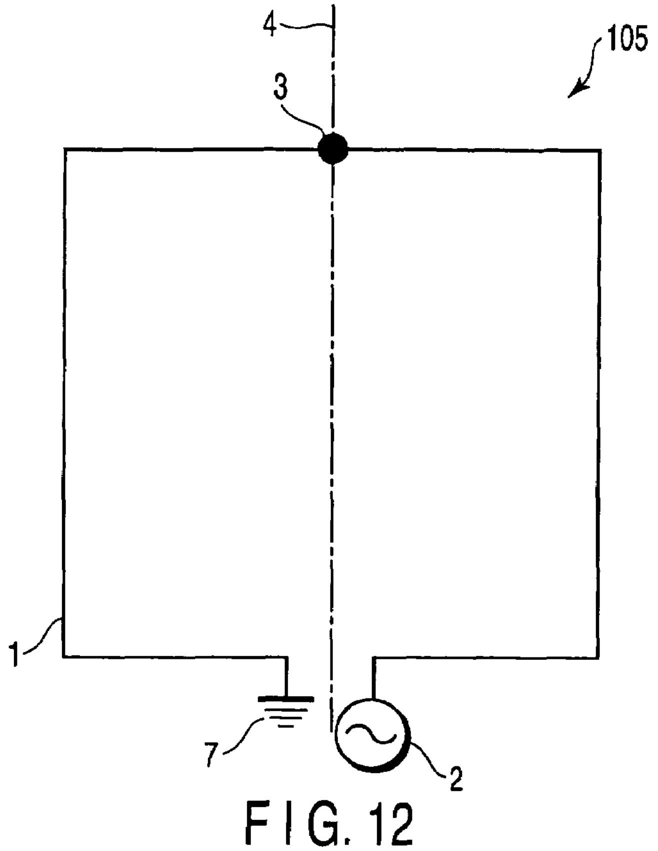
FIG. 12 schematically shows the configuration of a loop antenna, which can be housed in the portable telephone shown in FIG. 1, according to a fourth embodiment of the present invention.

FIG. 12 shows the configuration of a loop antenna, which can be used in the portable telephone shown in FIG. 1, according to a fourth embodiment of the present invention. In the loop antenna 105 shown in FIG. 12, the line 1 is short-circuited at one end to a ground plate 7 an is connected at the other end to the power supply point 2. The short-circuiting point to the ground plate 7 and the power supply point 2 are arranged in the vicinity of the symmetric line 4. The line length of the line 1 is set equal to two wavelengths, and the right and left sections of the loop antenna 105 are formed in symmetry with respect to the symmetric line 4.

Since one end of the line 1 is connected to the ground plate 7, the loop antenna 105 is of an imbalance type. In general, the transmitting-receiving circuit (not shown) on the side of the portable telephone body, which is connected to the power supply point 2, is equipped with an imbalance type power supply circuit. The imbalance type loop antenna and the imbalance type transmitting-receiving circuit can be directly connected to each other without employing the imbalance-balance conversion, i.e., can be connected with the imbalance state left unchanged.

According to the loop antenna shown in FIG. 12, the loss in the imbalance-balance converting circuit (not shown) can be eliminated so as to improve the radiation efficiency.

Figure 13:
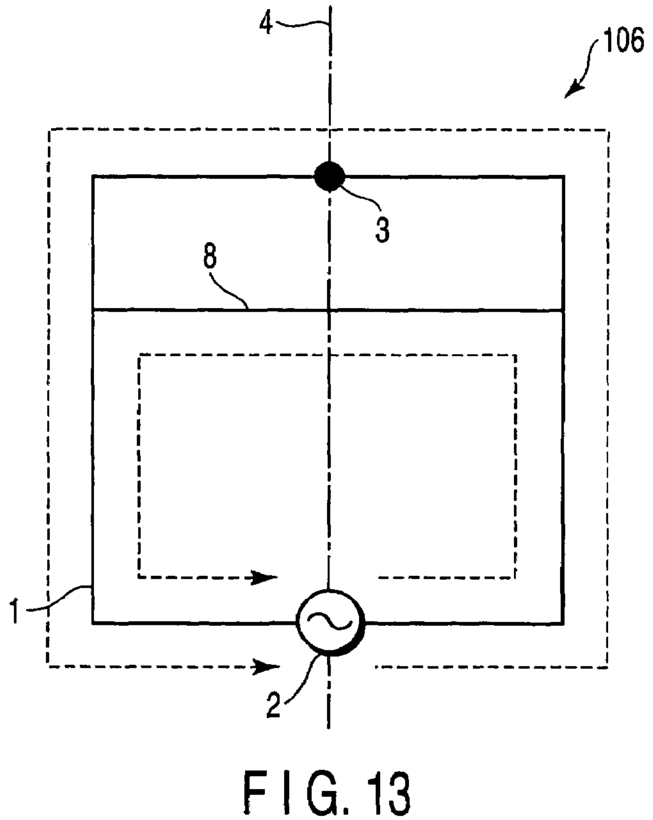
FIG. 13 is an oblique view schematically showing the configuration of a loop antenna, which can be housed in the portable telephone shown in FIG. 1, according to a fifth embodiment of the present invention.
Figure 14:
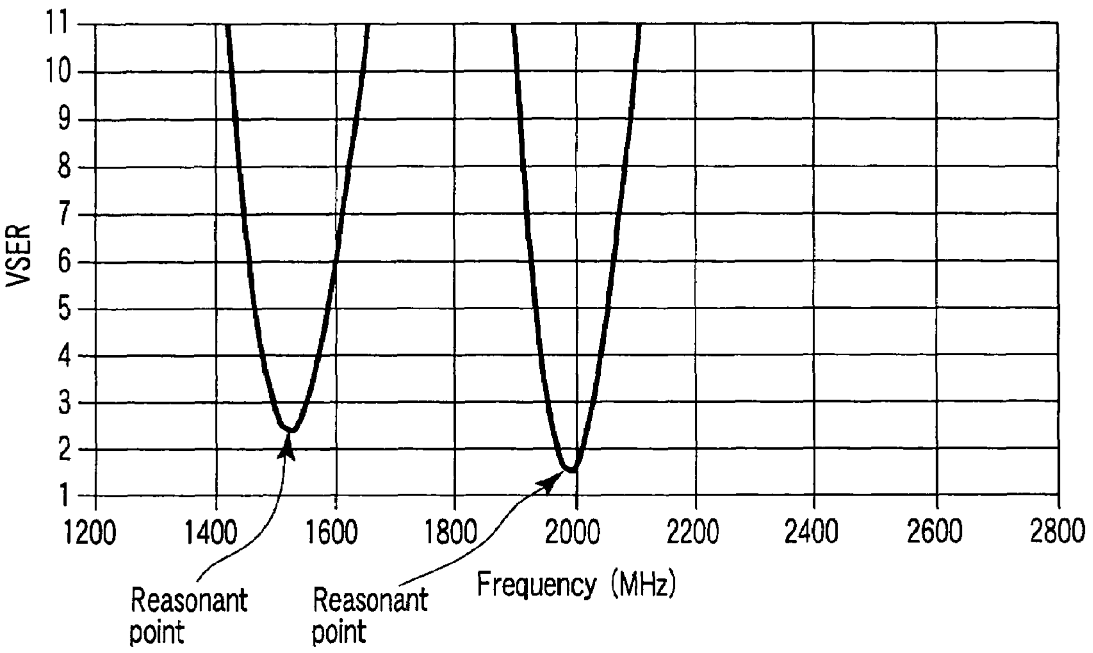
FIG. 14 is a graph showing the relationship between the VSWR value and the resonance frequency of the loop antenna shown in FIG. 13.

FIGS. 13 and 14 collectively show a fifth embodiment, in which the technical idea of the present invention is applied to a loop antenna for a portable telephone. Specifically, FIG. 13 shows the configuration of a loop antenna 106, and FIG. 14 is a graph showing the relationship between VSWR at the power supply point and the frequency.

The loop antenna 106 shown in FIG. 13 comprises a short-circuiting line 8 formed midway of the loop of the line 1 so as to achieve the short-circuiting between the right side portion and the left side portion of the line 1. Two loops including an outside loop having a larger line length and passing through the power supply point 2 and an inside loop having a smaller line length and passing through the power supply point 2 are formed because of the presence of the short-circuiting line, with the result that two different resonance frequencies are imparted to the loop antenna 106.

FIG. 14 is a graph showing the relationship between the VSWR value at the power supply point and the frequency in the loop antenna 106 shown in FIG. 13. It can be understood from FIG. 14 that generated are two resonance frequencies including a resonant point of the resonance frequency corresponding to the outside loop having a large line length and another resonant point of the resonance frequency corresponding to the inside loop having a small line length.

Since the loop antenna shown in FIG. 13 has two different resonance frequencies, the loop antenna can be incorporated in a portable telephone that can be utilized under the dual mode of two different frequencies.

Figure 15:
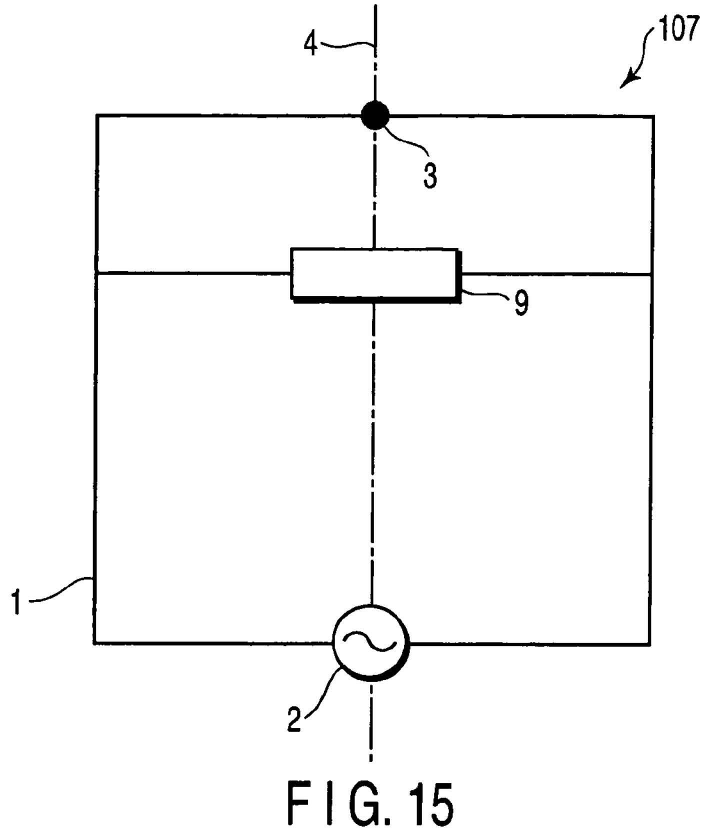
FIG. 15 schematically shows the configuration of a loop antenna, which can be housed in the portable telephone shown in FIG. 1, according to a sixth embodiment of the present invention.
Figure 16:
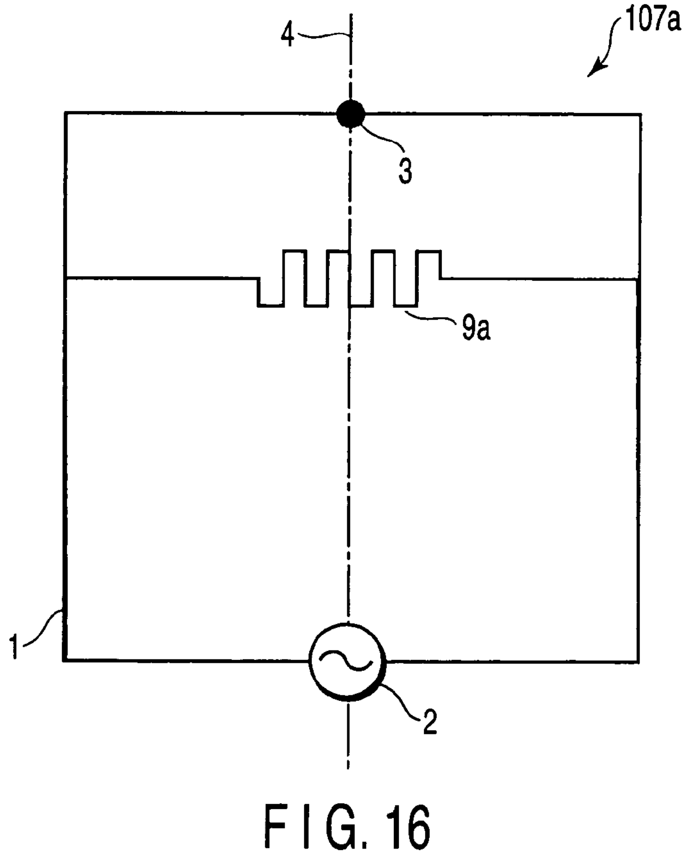
FIG. 16 schematically shows a specific configuration of the loop antenna shown in FIG. 15.
Figure 17:
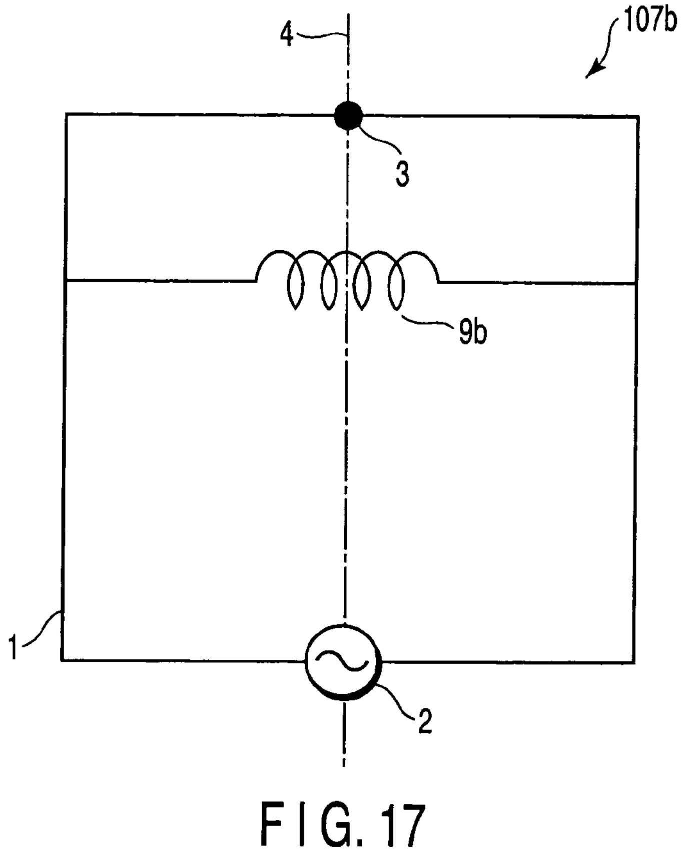
FIG. 17 schematically shows another specific configuration of the loop antenna shown in FIG. 15.
Figure 18:
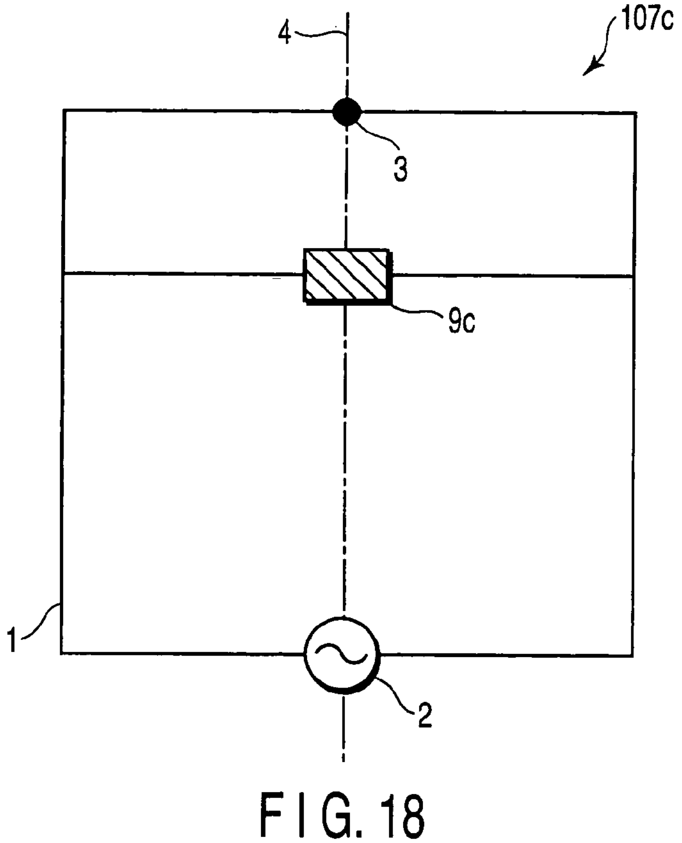
FIG. 18 schematically shows still another specific configuration of the loop antenna shown in FIG. 15.

FIGS. 15 to 18 collectively shows a six embodiment, in which the technical idea of the present invention is applied to a loop antenna for a portable telephone. Specifically, FIG. 15 shows the configuration of a loop antenna 107. FIG. 16 shows a specific configuration of the loop antenna shown in FIG. 15. FIG. 17 shows another specific configuration of the loop antenna shown in FIG. 15. Further, FIG. 18 shows still another specific configuration of the loop antenna shown in FIG. 15.

In the loop antenna 107 shown in FIG. 15, a component 9 for miniaturizing the loop antenna is arranged on the symmetric line 4 so as to be connected to a short-circuiting line configured to form the short-circuiting between the right side section and the left side section of the line 1. The miniaturizing component 9 corresponds to a meander component in which the line is formed zigzag, to a line component in which the line is formed helical, or to a dielectric element. The miniaturizing component 9 permits an electric line length not smaller than the mechanical size to be imparted to the second loop of the loop antenna. It follows that the two different resonance frequencies shown in FIG. 14 can be adjusted to a prescribed value by the miniaturizing component 9.

To be more specific, FIG. 16 shows a loop antenna 107*a* comprising a meander component 9*a* as the miniaturizing component 9 shown in FIG. 15. FIG. 17 shows a loop antenna 107*b* comprising a helical component 9*b* as the miniaturizing component 9 shown in FIG. 15. Further, FIG. 18 shows a loop antenna 107*c* comprising a dielectric component 9*c* as the miniaturizing component 9 shown in FIG. 15.

Since the loop antenna shown in each of FIGS. 15 to 18 has two different resonance frequencies, it is possible to incorporate the loop antenna in a portable telephone of a dual mode of two frequencies. It is also possible for the short-circuiting portion to decrease the length of the miniaturizing component.

Figure 19:
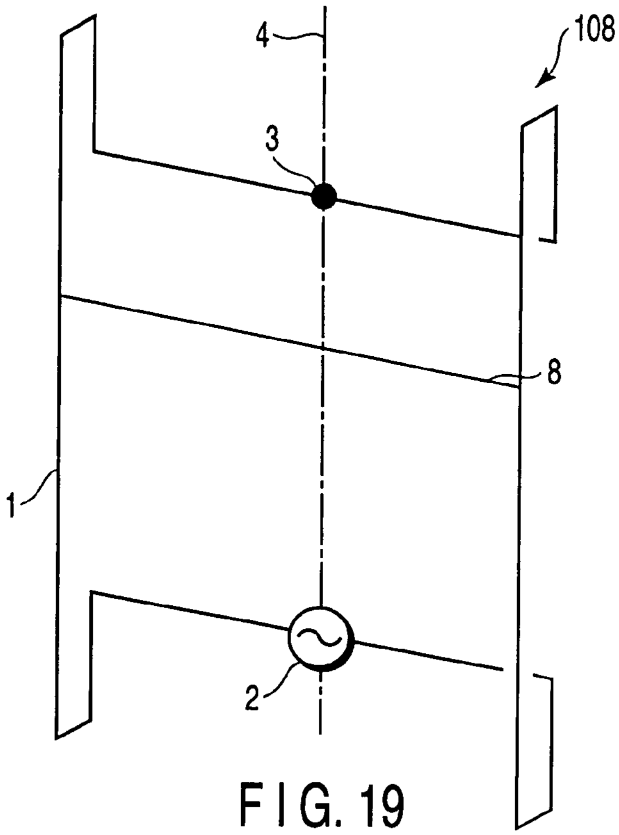
FIG. 19 is an oblique view schematically showing the configuration of a loop antenna, which can be housed in the portable telephone shown in FIG. 1, according to a seventh embodiment of the present invention.

FIG. 19 shows the configuration of a loop antenna according to a seventh embodiment in which the technical idea of the present invention is applied to a loop antenna for a portable telephone. In the loop antenna 108 shown in FIG. 19, the upper portion and the lower portion of the line 1 are folded toward the inner region of the loop antenna 108, and the right side section and the left side section of the loop antenna 108 are erected on the plane including the upper portion and the lower portion of the line 1 as in the loop antenna shown in FIG. 10. The entire length of the line 1 starting from the power supply point 2, passing through the half point 3, and ending in the power supply point 2 is set at the length equal to two wavelengths of a prescribed frequency, and the half point 3 is positioned one wavelength apart from the power supply point 2. Also, a short-circuiting line 8 configured to form the short-circuiting between the right side section and the left side section of the line 1 in the right-left direction is formed midway of the loop of the line 1 as in the loop antenna 106 shown in FIG. 13.

Since the loop antenna shown in FIG. 19 has two different resonance frequencies, it is possible to incorporate the loop antenna in a portable telephone of a dual mode of two different frequencies. Also, by folding a part of the line 1, the size of the entire antenna can be diminished while securing the line length of the first loop line 1 so as to make it possible to provide a small loop antenna and a small portable telephone.

Figure 21:
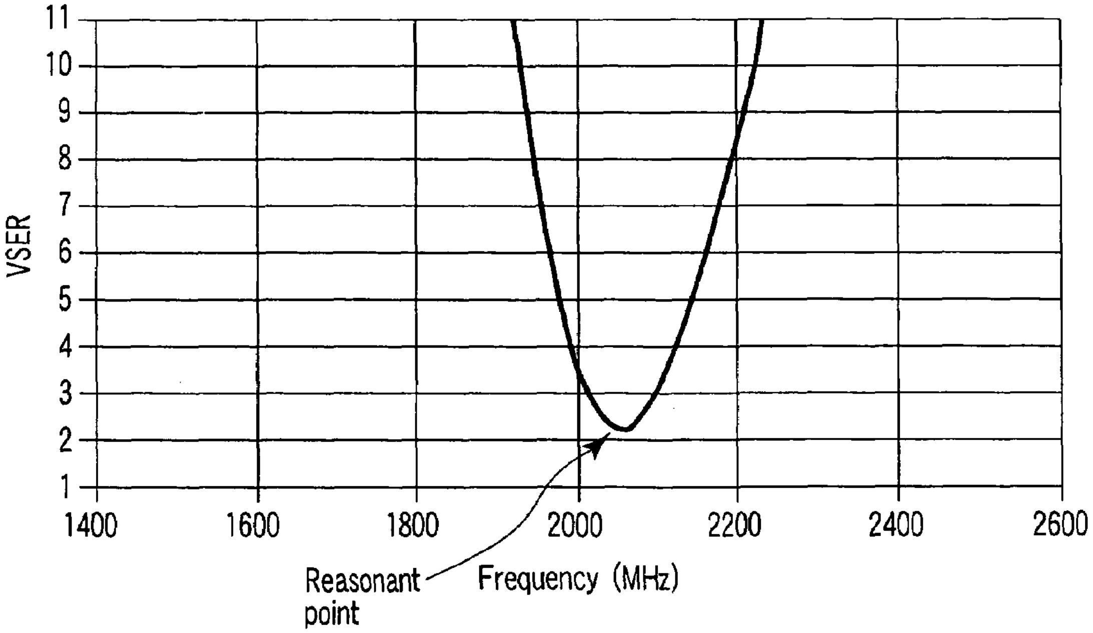
FIG. 21 is a graph showing the relationship between the VSWR value and the resonance frequency of the loop antenna shown in FIG. 20.
Figure 20:
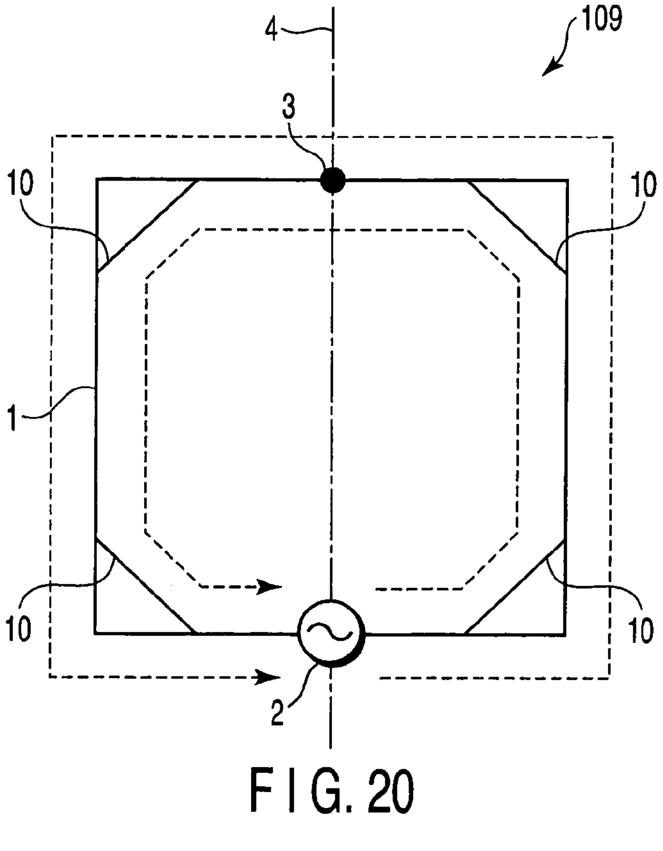
FIG. 20 schematically shows the configuration of a loop antenna, which can be housed in the portable telephone shown in FIG. 1, according to an eighth embodiment of the present invention.
Figure 22:
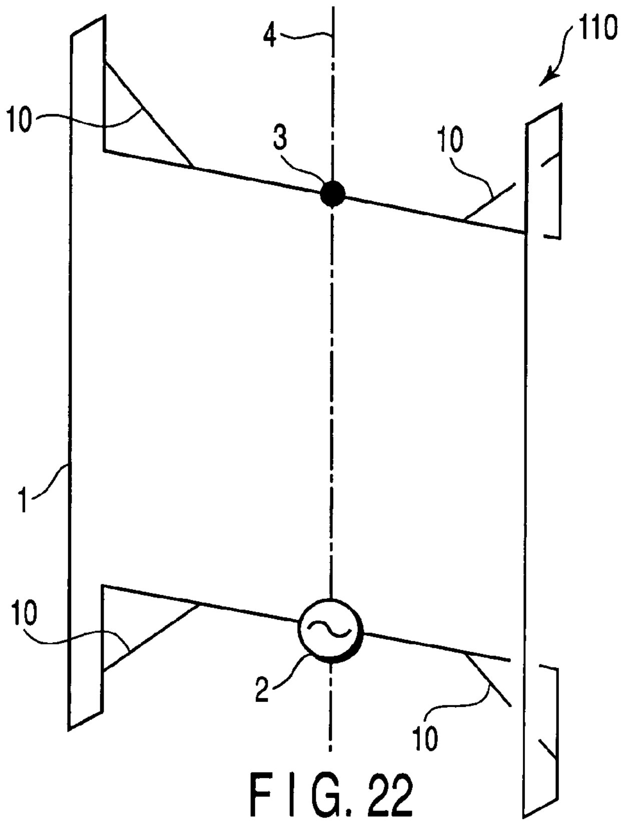
FIG. 22 schematically shows the construction relating to a modification of the loop antenna shown in FIG. 20.

FIGS. 20 to 22 collectively shows an eighth embodiment in which the technical idea of the present invention is applied to a loop antenna for a portable telephone. Specifically, FIG. 20 shows the configuration of a loop antenna 109. FIG. 21 is a graph showing the relationship between the VSWR value at the power supply point and the frequency. Further, FIG. 22 shows another construction relating to a modification of the loop antenna shown in FIG. 20.

In the loop antenna 109 shown in FIG. 20, a short-circuiting line 10 is formed in each of the four corners of the looped line 1, and each short-circuiting line 10 is connected to the line 1 in a manner to cross the corner portion of the looped line 1. Because of the formation of the short-circuiting lines 10, an outer first loop having a large line length and an inner second loop having a small line length are formed in the loop antenna 109. In the loop antenna of the particular construction, an appreciably large difference in the line length is not generated between the outer first loop and the inner second loop. As a result, generated are two resonance frequencies that are close to each other. To be more specific, since the resonance frequency corresponding to the outer loop having a large line length is close to the resonance frequency corresponding to the inner loop having a small line length, these two resonance frequencies are combined, with the result that the frequency characteristics having a large band width are imparted to the loop antenna, as shown in FIG. 21. It can be understood from the comparison with the frequency characteristics shown in FIG. 5 that the frequency characteristics shown in FIG. 21 have a large band width.

FIG. 22 shows the configuration of a loop antenna 110 corresponding to a modification of the loop antenna shown in FIG. 20. In the loop antenna 110 shown in FIG. 22, the upper portion and the lower portion of the line 1 are folded toward the inner region of the loop antenna 110, and the right side section and the left side section are erected on a plane including the upper portion and the lower portion of the line 1, as in the loop antenna shown in FIG. 10. The entire length of the line 1 starting from the power supply point 2, passing through the half point 3, and ending in the power supply point 2 is set at the length equal to two wavelengths of a prescribed frequency, and the half point 3 is positioned one wavelength apart from the power supply point 2. Also, short-circuiting lines 10 are arranged in four L-shaped lines arranged on a plane including the upper portion and the lower portion of the line 1 so as to achieve the short-circuiting in the L-shaped lines.

According to the loop antenna 110 shown in FIG. 22, the two resonance frequencies are close to each other so as to make it possible to achieve a large band width. Also, by folding a part of the line 1, the size of the entire loop antenna can be diminished while securing a prescribed length of the line 1. It follows that it is possible to realize a small loop antenna and a small portable telephone.

Figure 23:
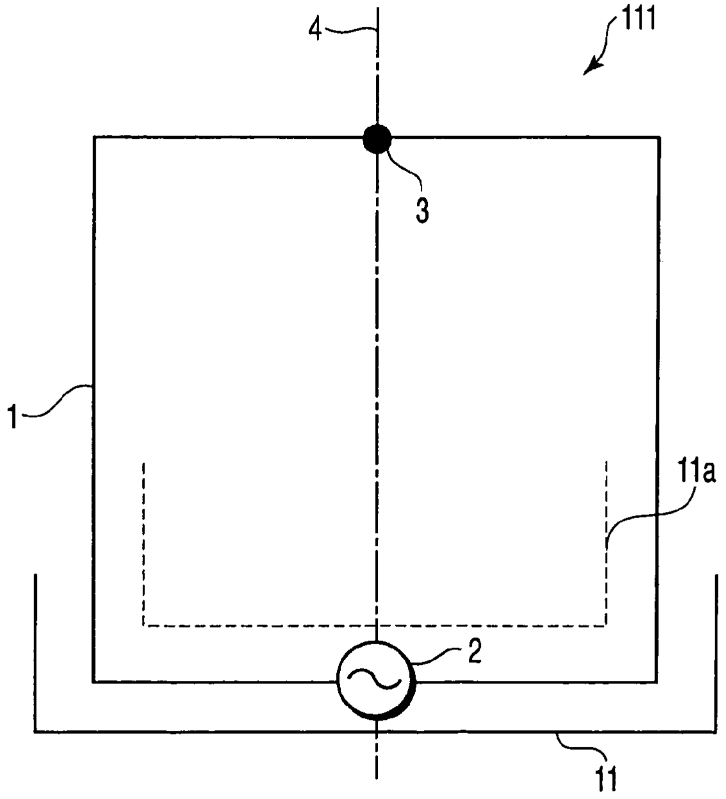
FIG. 23 schematically shows the configuration of a loop antenna, which can be housed in the portable telephone shown in FIG. 1, according to a ninth embodiment of the present invention.

FIG. 23 shows the configuration of a loop antenna 111 according to a ninth embodiment, in which the technical idea of the present invention is applied to a loop antenna for a portable telephone. Those portions of the loop antenna 111 which are equal to the loop antenna for the fifth embodiment of the present invention, which is shown in FIG. 13, are denoted by the same reference numerals, and the operation of the ninth embodiment shown in FIG. 23 will now be described with an emphasis put mainly on the portions differing from the loop antenna shown in FIG. 13. As apparent from FIG. 23, a short-circuiting element is not included in the loop antenna 111. In place of forming the short-circuiting element, a parasitic element 11 is arranged outside of the line 1 such that the parasitic element 11 extends in parallel to the lower side section of the line 1. The line length of the parasitic element 11 is substantially equal to ½ wavelength of a desired resonance frequency differing from the resonance frequency of the line 1. Where the line length of the parasitic element 11 exceeds the length of the lower side section of the line 1, the both edge portions of the parasitic element 11 are folded upward. As a result, the VSWR as viewed from the power supply point generates different resonance frequencies like the VSWR for the fifth embodiment of the present invention shown in FIG. 14. Incidentally, where a parasitic element **11*a* is arranged inside the line 1 as denoted by a dotted line in FIG. 23 in place of the parasitic element 11 arranged outside the line 1**, it is possible to obtain the similar characteristics.

The loop antenna 111 according to the ninth embodiment of the present invention has two resonance frequencies so as to make it possible to incorporate the loop antenna 111 in a portable telephone of a dual mode of two frequencies.

Figure 24:
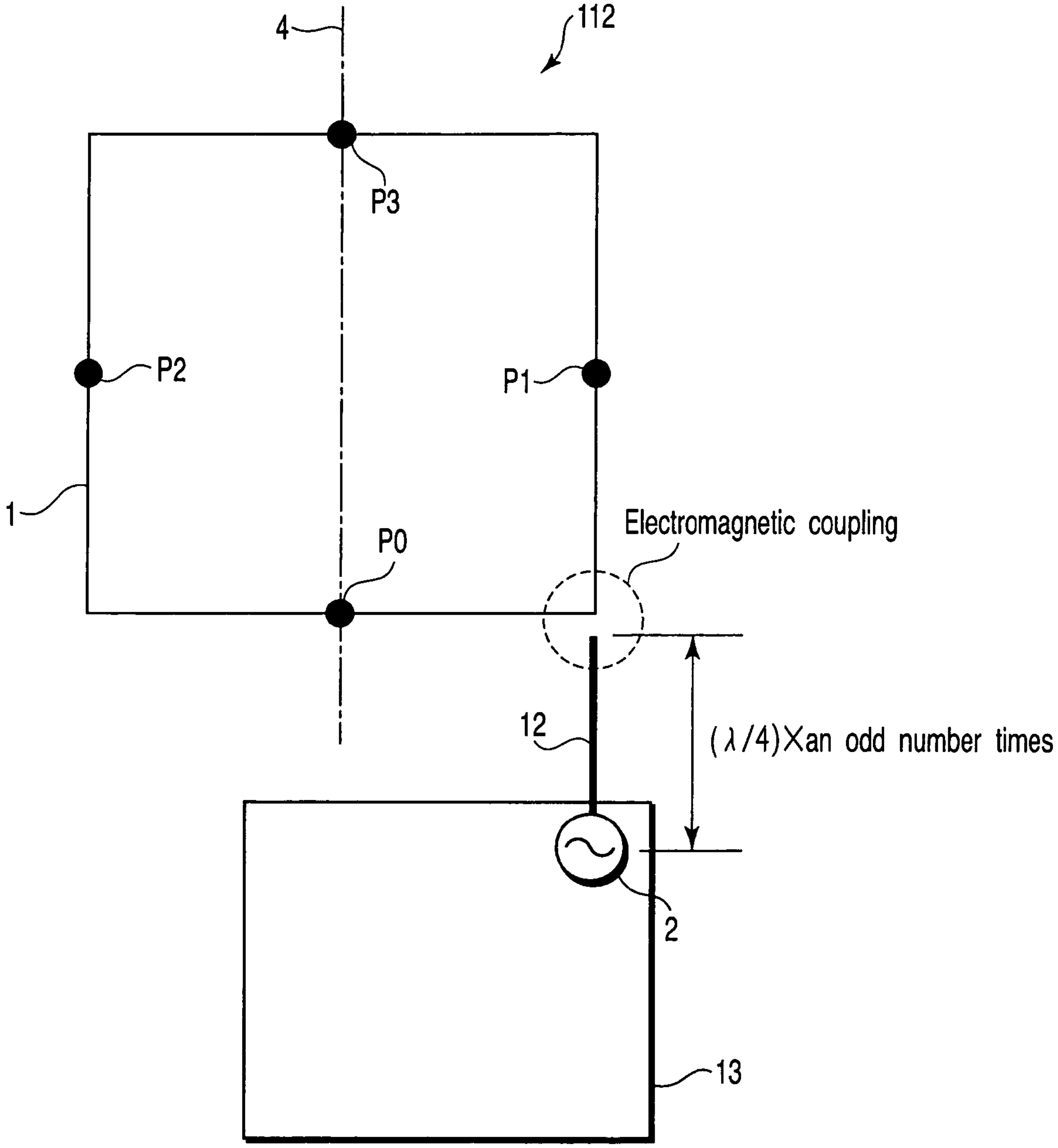
FIG. 24 schematically shows the configuration of a loop antenna, which can be housed in the portable telephone shown in FIG. 1, according to a tenth embodiment of the present invention.
Figure 25:
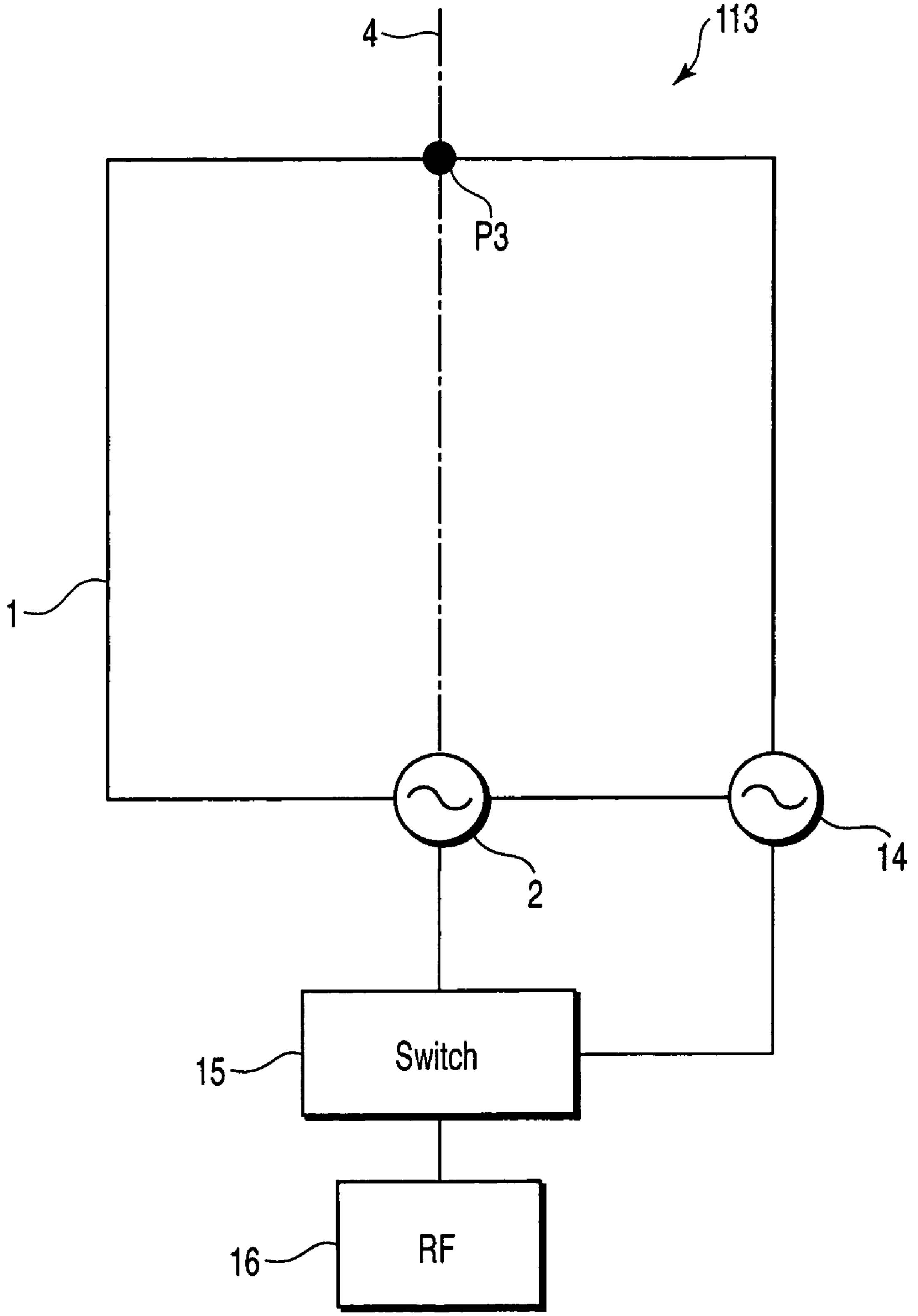
FIG. 25 schematically shows the configuration of a loop antenna, which can be housed in the portable telephone shown in FIG. 1, according to an eleventh embodiment of the present invention.

FIGS. 24 and 25 collectively show a tenth embodiment, in which the technical idea of the present invention is applied to a loop antenna for a portable telephone. Specifically, FIG. 24 shows the configuration of a loop antenna 112, and FIG. 25 shows the construction relating to a modification of the loop antenna 112 shown in FIG. 24.

Where there is a restriction in terms of the configuration of the portable telephone such that it is impossible to supply an electric power from the power supply point of the loop antenna directly to the line 1, a power supply point is mounted to a printing substrate 13 outside the line 1, and a power supply line 12 is connected to the power supply point. Under this condition, an electromagnetic coupling is achieved between the tip portion of the power supply line 12 and the line 1 of the loop antenna 112 shown in FIG. 24 so as to achieve the power supply. In the arrangement shown in FIG. 24, the power supply line 12 is arranged on an imaginary line extending from the right side section of the line 1, and the power supply point 2 is positioned on the printing substrate 13 arranged on the imaginary line extending from the right side of the line 1. The length of the power supply line 12 is defined to be an odd number times as long as about ¼ wavelength of the resonance frequency of the line 1. Also, the distance of the path between a point P0, which is an intersection between the line 1 and the symmetric line 4, and the power supply point, the path including the electromagnetic coupling point, is defined to be an integer number times as long as about ½ wavelength.

In the arrangement shown in FIG. 24, an electric power is supplied from the power supply point 2 to the line 1 through the power supply line 12. By this power supply, the driving power is rendered maximum at the power supply point 2 and the point P0 that is apart from the power supply point 2 by ½ wavelength. The driving power is also rendered maximum at each of points P1 and P2, which are apart from the point P0 by ½ wavelength, and at point P3 which is apart from any of the points P1 and P2 by ½ wavelength. It should be noted in this connection that the driving current vector similar to that described previously with reference to FIG. 3 is generated in the loop antenna, with the result that the current distribution on the right side and the current distribution on the left side are rendered symmetric in the loop antenna with respect to the symmetric line 4. It follows that a null can be formed in the radiation characteristics in the direction toward the user of the portable telephone.

According to the loop antenna shown in FIG. 24, the power supply point can be arranged freely even in the case where there is a restriction in respect of the configuration of the portable telephone so as to enhance the degree of freedom of the design.

FIG. 25 shows the configuration of a loop antenna 113 according to an eleventh embodiment, in which the technical idea of the present invention is applied to the loop antenna for a portable telephone.

In the loop antenna 113 shown in FIG. 25, a power supply point 14 is formed on, for example, the lower right corner of the line 1 in addition to the power supply point 2 formed on the symmetric line 4 as in FIG. 2. The power supply points 2 and 14 are selected by a switch 15 arranged between each of the power supply points 2, 14 and an RF 16.

If the power supply point 2 on the symmetric line 4 is selected by the switch 15 in the loop antenna 113 shown in FIG. 25, the driving current vectors on the right side and the left side, which are in symmetry with respect to the symmetric line 4, are generated on the line of the loop antenna 113. As a result, the radiation characteristics are set at a null in a direction perpendicular to the plane of the loop antenna 113, i.e., in the direction toward the user of the portable telephone.

Then, if the power supply point 14 is selected by the switch 15, the driving current vectors that are in symmetry with respect to the diagonal line passing through the power supply point 14 are generated in the line 1. The radiation characteristics caused by the driving current vectors are rendered different from the radiation characteristics caused by the driving current vectors shown in FIG. 3. As a matter of fact, the radiation characteristics are naturally rendered different. In this fashion, in the case where the loop antenna includes a plurality of power supply points, it is possible to select a desired directivity by switching the power supply point by operating the switch so as to switch the radiation characteristics.

Incidentally, it is possible to arrange an exclusive RF circuit (not shown) for the power supply point 2 and another exclusive RF circuit (not shown) for the power supply point 14 in place of mounting the switch 15 so as to selectively drive these two RF circuits. In the construction comprising a plurality of RF circuits, it is possible to achieve a multi-resonance by allowing a plurality of frequencies differing from each other to resonate with each other, or it is possible to enlarge the band width by allowing a plurality of frequencies close to each other to resonate with each other.

Figure 26:
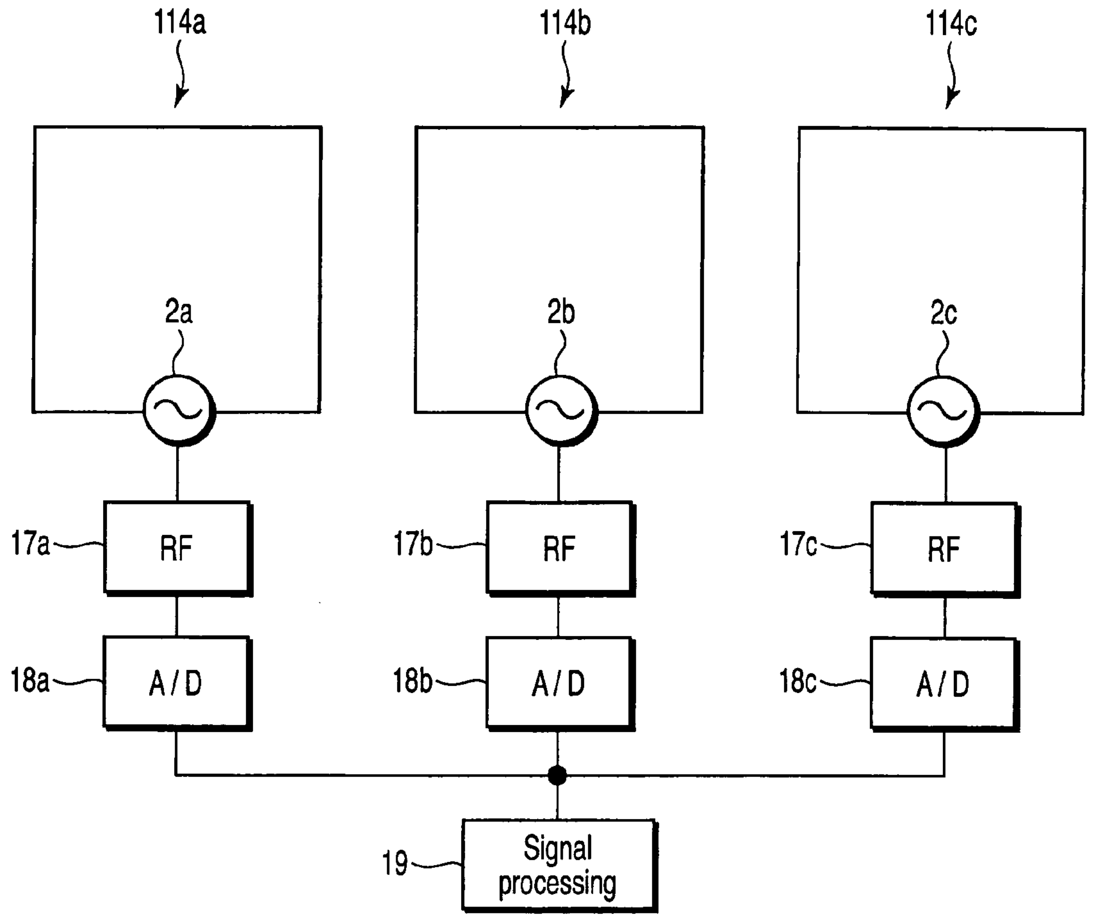
FIG. 26 schematically shows the configuration of a loop antenna, which can be housed in the portable telephone shown in FIG. 1, according to a twelfth embodiment of the present invention.

FIG. 26 shows the configuration of a loop antenna apparatus according to a twelfth embodiment, in which the technical idea of the present invention is applied to a loop antenna for a portable telephone. In the loop antenna apparatus shown in FIG. 26, arranged are a plurality of loop antennas, e.g., three loop antennas 114*a*, 114*b*, 114*c* each including a line and a power supply point. Also, RF circuits 17*a* to 17*c* and AD converters 18*a* to 18*c* are connected to the power supply points 2*a*, 2*b*, 2*c* of the loop antennas 114*a*, 114*b*, 114*c*, respectively. Further, a signal processing section 19 is commonly connected to the AD converters 18*a* to 18*c*.

In the antenna apparatus shown in FIG. 26, the magnitude of the driving current for each loop antenna is controlled so as to make the magnitudes of the radiation characteristics different from each other. A plurality of different radiation characteristics are combined so as to make it possible to change the directivity of the entire antenna apparatus comprising a plurality of loop antennas. Alternatively, a plurality of radiation characteristics can be combined by changing the arrangement among a plurality of loop antennas so as to change the directivity of the antenna apparatus including a plurality of loop antennas. It is also possible to achieve a multi-resonance by allowing a plurality of loop antennas to resonate with each other under frequencies differing from each other, or it is possible to enlarge the band width by allowing a plurality of loop antennas to resonate with each other under frequencies close to each other.

Figure 27:
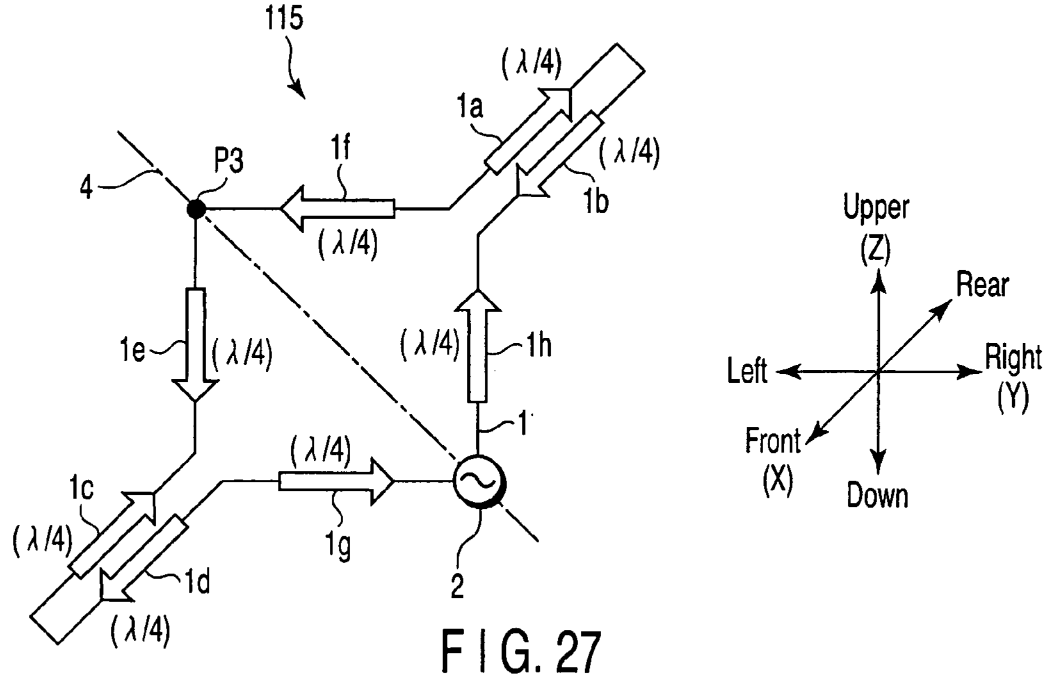
FIG. 27 schematically shows the configuration of a loop antenna, which can be housed in the portable telephone shown in FIG. 1, according to a thirteenth embodiment of the present invention.

Finally, FIG. 27 shows the configuration of a loop antenna 115 according to a thirteenth embodiment, in which the technical idea of the present invention is applied to the loop antenna for a portable telephone and also shows the distribution of the driving current. In the loop antenna 115 shown in FIG. 27, the line 1 is formed such that parallel lines on the YZ plane each having a length equal to ¼ wavelength extend obliquely upward and obliquely downward from the upper right portion and the lower left portion of the line 1, respectively. Also, the line length of each of the right side portion, the left side portion, the upper side portion and the lower side portion of the line 1 is set at a length equal to ¼ wavelength. The entire length of the line 1 is equal to two wavelengths (¼ wavelength×8). The power supply point 2 is arranged at the intersection between the right side section and the lower side section of the line 1.

The line length between the power supply point 2 and point P3 positioned on the diagonal line passing through the power supply point 2 is equal to one wavelength on each of the right side and the left side. It should be noted that the line 1 is arranged in symmetry with respect to the symmetric line 4 (diagonal line noted above) extending through the power supply point 2 and the point P3 noted above.

When it comes to the driving current vectors, driving current vectors 1*h*, 1*b*, 1*a*, 1*f*, 1*e*, 1*c*, 1*d* and 1*g* are generated in the counterclockwise direction about the power supply point 2. The relationship between the power supply point 2 and the driving current vectors shown in FIG. 3 is maintained in these driving current vectors shown in FIG. 27 so as to shift these driving current vectors.

The driving current vectors 1*h* and 1*e* are opposite to each other in phase if viewed leftward and rightward from the Z-axis, as shown in FIG. 27. It follows that the radiation pattern of the electromagnetic field on the XY plane is constricted in the front-rear direction in the central portion in the right-left direction like the radiation pattern shown in FIG. 4, with the result that a null is generated in the front-rear direction in the central portion in the right-left direction.

According to the loop antenna 115 shown in FIG. 27, a null of the radiation characteristics is formed in a direction perpendicular to the plane of the loop antenna, i.e., in the direction toward the user of the portable telephone. It follows that the radiation efficiency of the antenna is improved without giving rise to the mismatch loss and the dielectric loss caused by the human body.

Incidentally, each embodiment of the present invention is described independently in the present specification. However, it is possible to combine a plurality of embodiments of the present invention so as to operate the loop antenna as a loop antenna having a different construction. Also, each of the embodiments described above is directed to the case where the loop antenna of the present invention is used in a portable telephone. However, it is also possible to use the loop antenna of the present invention in a mobile communication terminal such as PDA.

According to the present invention, a null of the radiation characteristics is formed in a direction perpendicular to the plane of the loop antenna, i.e., in the direction toward the user of the portable telephone, so as to make it possible to improve the radiation efficiency of the antenna during the telephone conversation. It is also possible to miniaturize the loop antenna.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A mobile communication terminal, comprising:

a casing having a first surface;

a receiver section which is configured to reproduce a voice, and which is arranged at the first surface of the casing;

a two-wavelength loop antenna housed in the casing and arranged in a plane that is substantially parallel to the first surface of the casing; and a power supply point to supply electric power to the loop antenna;

wherein the two-wavelength loop antenna comprises a looped line that is divided by an imaginary line of symmetry into first and second portions that are arranged substantially in symmetry with respect to the imaginary line of symmetry and which are connected to each other at first and second intersections arranged on the imaginary line of symmetry;

wherein each of the first and second portions comprises:

a first line which is connected to the first intersection and which has a length of substantially ¼ of a wavelength of an electrical wave having a predetermined frequency;

a second line which is connected to the first line and which has a length of substantially ½ of the wavelength of the electrical wave, wherein the second line is shaped in a folded form so as to cancel current vectors produced in the second line; and a third line which is connected between the second line and the second intersection and which has a length of substantially ¼ of the wavelength of the electrical wave; and wherein the power supply point is arranged in a vicinity of the first intersection.

* * * * *